US008364805B2

(12) United States Patent
Mandell (10) Patent No.: US 8,364,805 B2
(45) Date of Patent: Jan. 29, 2013

(54) METHOD AND APPARATUS OF MATCHING MONITORING SETS TO NETWORK DEVICES

(75) Inventor: Corey Dana Mandell, Bothell, WA (US)

(73) Assignee: Kaseya International Limited, St. Helier, Jersey ( * ) Notice: Subject to any disclaimer, the term of this patent is extended or adjusted under 35 U.S.C. 154(b) by 152 days.

(21) Appl. No.: 13/032,343

(22) Filed: Feb. 22, 2011

(65) Prior Publication Data

US 2012/0215906 A1 Aug. 23, 2012

(51) Int. Cl.
*G06F 15/173* (2006.01)

(52) U.S. Cl. ........ 709/223; 709/212; 709/221; 709/222; 709/230

(58) Field of Classification Search .................. 709/212, 709/220, 223, 224, 230
See application file for complete search history.

(56) References Cited

U.S. PATENT DOCUMENTS

| 5,996,010 | A | * | 11/1999 | Leong et al. ................ 709/223 |
| 6,009,458 | A | * | 12/1999 | Hawkins et al. ............. 709/203 |
| 6,085,237 | A | * | 7/2000 | Durham et al. .............. 709/221 |
| 6,549,943 | B1 | * | 4/2003 | Spring .......................... 709/223 |
| 6,615,201 | B1 | * | 9/2003 | Seshadri et al. ..................... 1/1 |
| 7,752,300 | B2 | * | 7/2010 | Havard ......................... 709/223 |
| 8,060,456 | B2 | * | 11/2011 | Gao et al. ........................ 706/12 |
| 2006/0047801 | A1 | * | 3/2006 | Haag et al. ................... 709/223 |
| 2006/0101138 | A1 | * | 5/2006 | Son .............................. 709/223 |
| 2010/0257127 | A1 | * | 10/2010 | Owens ........................... 706/12 |
| 2012/0215906 | A1 | * | 8/2012 | Mandell ....................... 709/224 |

* cited by examiner

*Primary Examiner* — Michael Won (57) ABSTRACT

A method and apparatus of monitoring computer devices operating on a network is disclosed. Computer devices are all different and require monitoring settings that are tailored to their specific requirements. One example method of assigning a sample set to a network device operating on a network may include identifying the at least one network device, and identifying at least one object identifier associated with the at least one identified network device. The method may also include transmitting the at least one object identified to a memory location, and comparing the at least one object identifier to a plurality of sample sets and assigning relevancy scores to the plurality of sample sets based on the comparison. The method may also include assigning at least one sample set having a greater relevancy score than the other sample sets to the at least one network device. The sample sets may be SNMP sample sets.

20 Claims, 6 Drawing Sheets

METHOD AND APPARATUS OF MATCHING MONITORING SETS TO NETWORK DEVICES

TECHNICAL FIELD OF THE INVENTION

This invention relates to a method and apparatus of automatically matching a specific monitoring profile to a computer network device, and, more specifically, to determining a particular monitoring set among numerous monitoring sets that is best suited for the identified network device.

BACKGROUND OF THE INVENTION

Automated computer device monitoring services and applications are commonplace in the information technology world today. All types and variations of computers, handheld devices, laptops, smartphones, servers, terminals, printers or other computing devices are generally part of a communication network. As a result, computing devices have been utilizing automated network services to centrally manage and monitor various features, such as, device performance and activity. For example, a laptop or desktop computer operated by an employee of a corporation may receive multiple daily management processes from a remote server during the course of day.

For any of the various types of network devices operating on a network, certain applications are used to monitor the process status of the services being implemented by those devices. The simple network management protocol (SNMP) is a protocol and application that is often used for monitoring the process status of a network device. SNMP is also used as a protocol for monitoring and controlling the resulting processes being utilized across the network.

Previous monitoring procedures that utilize SNMP require the network administrator to perform the time-consuming, expensive and arduous task of creating individual SNMP monitor sets for each computing device on a network. Alternatively, the SNMP monitor sets may be created ahead of time, however, those predefined SNMP monitor sets may be numerous and different from one another. Across an entire enterprise, the number of different SNMP monitor sets may be in the hundreds or even thousands. Finding the best match for a particular network device requires time and the expertise of a network administrator.

SUMMARY OF THE INVENTION

One embodiment of the present invention may include a method of assigning a sample set to a network device operating on a network. The method may include identifying the at least one network device and identifying at least one object identifier associated with the at least one identified network device. Other operations may include transmitting the at least one object identified to a memory location, comparing the at least one object identifier to a plurality of sample sets and assigning relevancy scores to the plurality of sample sets based on the comparison, and assigning at least one sample set having a greater relevancy score than the other sample sets to the at least one network device.

Another example embodiment may include an apparatus configured to assign a sample set to a network device operating on a network. The apparatus may include a processor configured to identify the at least one network device, and identify at least one object identifier associated with the at least one identified network device. The apparatus may also include a transmitter configured to transmit the at least one object identified to a memory location. The processor may be further configured to compare the at least one object identifier to a plurality of sample sets and assigning relevancy scores to the plurality of sample sets based on the comparison, and assign at least one sample set having a greater relevancy score than the other sample sets to the at least one network device.

DETAILED DESCRIPTION OF THE INVENTION

It will be readily understood that the components of the present invention, as generally described and illustrated in the figures herein, may be arranged and designed in a wide variety of different configurations. Thus, the following detailed description of the embodiments of a method, apparatus, and system, as represented in the attached figures, is not intended to limit the scope of the invention as claimed, but is merely representative of selected embodiments of the invention.

The features, structures, or characteristics of the invention described throughout this specification may be combined in any suitable manner in one or more embodiments. For example, the usage of the phrases "example embodiments", "some embodiments", or other similar language, throughout this specification refers to the fact that a particular feature, structure, or characteristic described in connection with the embodiment may be included in at least one embodiment of the present invention. Thus, appearances of the phrases "example embodiments", "in some embodiments", "in other embodiments", or other similar language, throughout this specification do not necessarily all refer to the same group of embodiments, and the described features, structures, or characteristics may be combined in any suitable manner in one or more embodiments.

In addition, while the term "message" has been used in the description of embodiments of the present invention, the invention may be applied to many types of network data, such as packet, frame, datagram, etc. For purposes of this invention, the term "message" also includes packet, frame, datagram, and any equivalents thereof. Furthermore, while certain types of messages and signaling are depicted in exemplary embodiments of the invention, the invention is not limited to a certain type of message, and the invention is not limited to a certain type of signaling.

Figure 1:
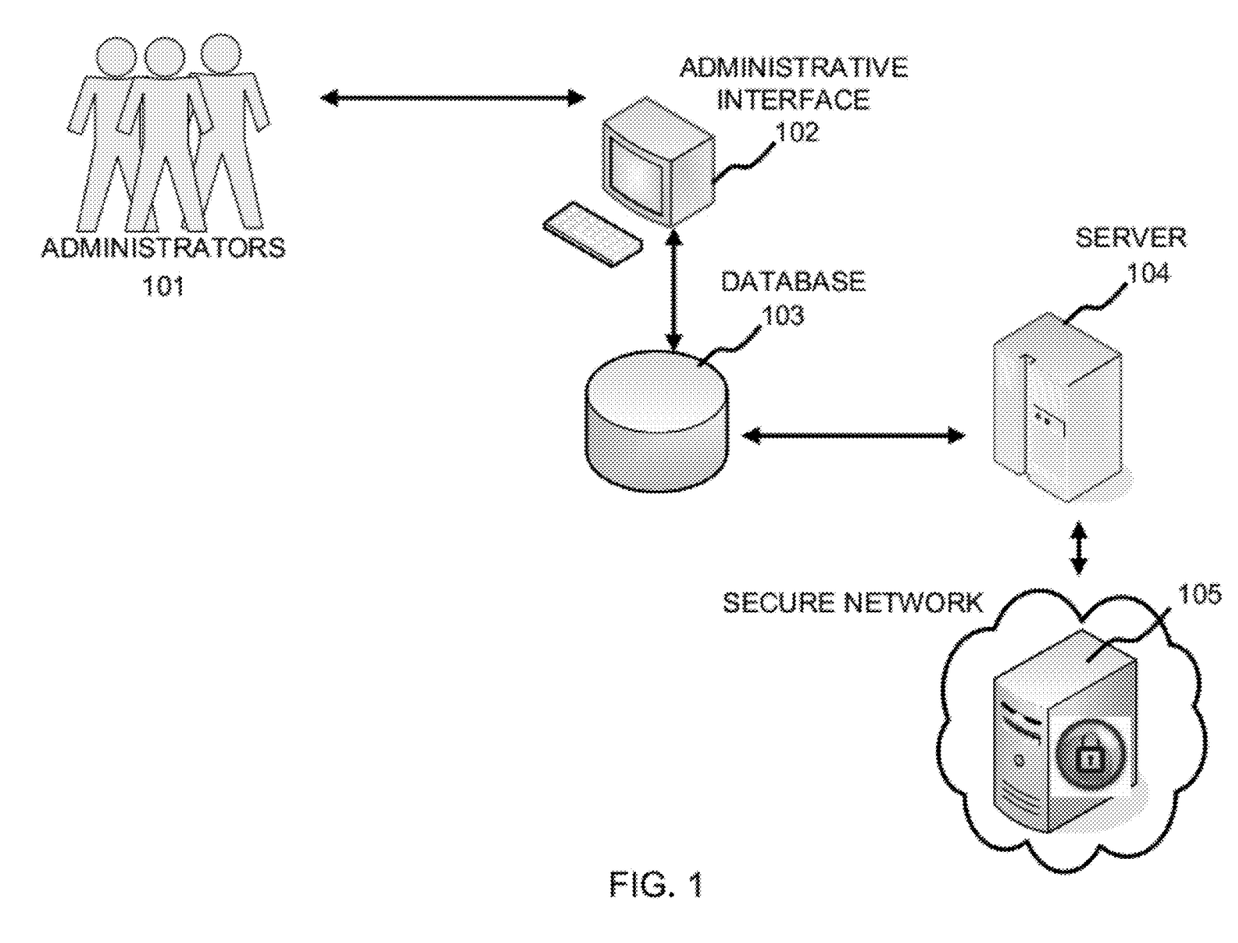
FIG. 1 illustrates an example network configuration, according to example embodiments of the present invention.

FIG. 1 illustrates an example communication network, according to example embodiments of the present invention. Referring to FIG. 1, administrators 101 may access an administrative user interface 102 to begin operating a SNMP procedure. The interface may be a virtual array processor (VSA) interface that is accessible via a user terminal computer or other interface device. The VSA interface is a functional interface that may be used to perform operations and functions and control program execution.

A local area network (LAN) watch procedure may be setup and executed through the VSA interface 102. A SNMP agent procedure may also be initialized to find SNMP computer devices operating on the network. The agent procedure may be scheduled to perform a "SNMPWalk" on a private network branch for all SNMP devices that respond to the agent procedure. The response may be received in receipt to a "SNMPGet" command (e.g., SNMPGet.exe—sysDescr command). Configuration data used to operate the LAN watch procedure may be received from the VSA interface 102 and forwarded to the database 103. Reference to the configuration data may be performed by the operating server 104 which executes the SNMP discovery procedures and then returns the SNMP monitor results.

Another command that may be used to obtain information may be a "SNMPWalk" command. A SNMPWalk is a SNMP command that asks a particular device to return values for all the 'objects' that the device may monitor. Certain targeted portions of the monitored objects may include portions of the MIB2 and the PRIVATE branch. Executing a SNMPWalk command or similar query command may yield thousands of objects. The objects may, in turn, be analyzed according to a relevancy algorithm, which matches the best monitor set of objects by examining the monitored objects in the set.

Figure 2:
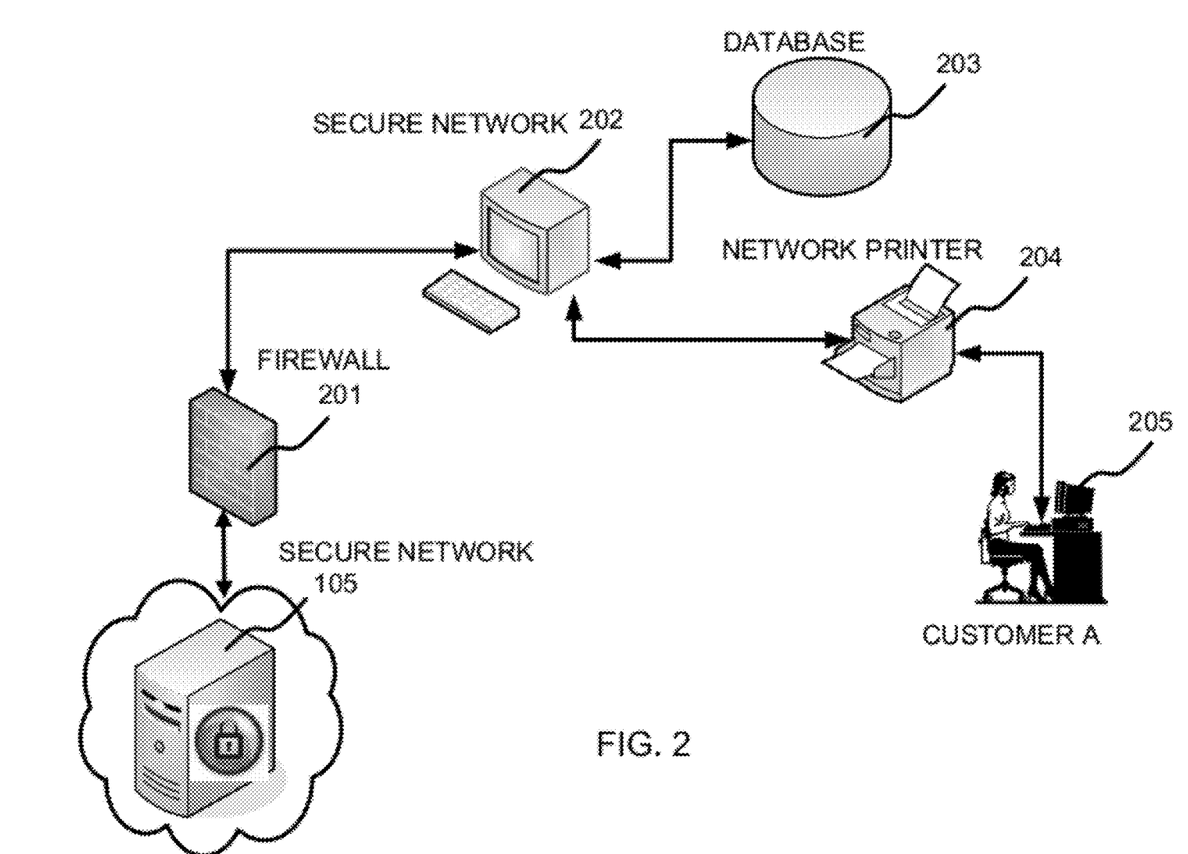
FIG. 2 illustrates another example network configuration, according to example embodiments of the present invention.

FIG. 2 illustrates an example network according to example embodiments of the present invention. Referring to FIG. 2, once a LAN watch has been initiated and an agent procedure is scheduled to find SNMP devices, SNMPWalk data may be stored in a database 103 associated with the VSA administrative interface 102. Each discovered object identifier (OID) and instance pair returns a value which may be stored in the database 103. The server 104 executes the SNMP procedures via the server 104 over the secure network 105 to a customer site (see FIG. 2).

Continuing with the network communication of FIG. 1, the flow of data is further illustrated with reference to FIG. 2. Referring to FIG. 2, the secure network 105 includes a firewall 201 that may be authenticated to obtain access to the customer network. A secure network 202 provides access to customer computers, such as, customer A 205. Other devices on the network may be monitored, such as, a network printer 204, print server or email server, etc. A database 203 may provide access to customer data and related customer information.

In operation, a discovery procedure may be used in accordance with SNMP. For example, under control of the monitoring software, the server 104 searches a preconfigured list of TCP/IP addresses for devices, such as, computers, printers, etc. which are capable of making a SNMP connection. The host computer then attempts to extract data from each device via known SNMP OID ("object identifier") data requests to establish a method by which subsequent extraction of information from the network devices may be performed.

With the extraction method established, a series of device parameters is then extracted from the network devices. For example, for a network printer 204, the exact parameters may depend on the type of print server embedded in the printer (e.g. print engine manufacturer, serial number, device supplies such as toner level or remaining paper count, and counters/meters for the printer). Where the needed data cannot be provided using SNMP extraction, the monitoring software interrogates the printer device over TCP/IP ("Transmission Control Protocol" and the "Internet Protocol") using HTTP ("Hypertext Transfer Protocol").

The scope of the data attainable by this second method is typically more limited, but can include printer serial number, counters/meters, and device supplies, such as toner level and remaining paper count. In the event that both the SNMP and HTTP methods fail to provide the requested data, a printer job language (PJL) interrogation protocol over TCP/IP may be employed.

During monitoring, the host computer interrogates the monitored printers on a regular/scheduled interval to update stored parameters and to check for status and/or supplies changes. Device status changes may also initiate an interrogation when SNMP traps (i.e. notification sent by the monitored device to the monitoring device without being prompted) are employed. Printer state changes (e.g. up, down, idle, printing, warning, etc.) and toner cartridge levels are monitored in order to provide notifications where desired, and historical data is gathered over time and used to determine if the cartridge has been changed or if an operator has manipulated the cartridge to extend the toner life on an existing cartridge.

The host computer also detects and logs printer exchanges at a monitored IP address, and can track a printer continuously even if it is moved to a different IP address. Print, copy, scan and fax volumes undertaken by a printer are calculated by tracking meters/page counts over a period of time. The host computer e-mails alerts in the event of a change in printer status, if it is unable to contact the printer via TCP/IP, if supplies level drops below a specified level, and for other events. Printers have been used in this example, however, any network device may have its corresponding OID parameters identified and extracted.

In order to match network devices with predefined SNMP monitor sets, a best fit must be determined to avoid unnecessary false positive alarms. In other words, if the discovered SNMP network device is paired with a SNMP monitor set that is not best suited for that network device, then alarms may occur which are unnecessary or trivial. For example, a particular network device will have customized hardware and software associated with its operation. A SNMP monitor set that is intended for a computer with OIDs indicating less memory and processor capacity than the actual capacity of that particular network device would cause false positive alarms if paired with this particular network device. Such false positive alarms cause wasted time and efforts of the administrators responsible for the network.

SNMP generally includes three key components: managed devices, agents, and network-management systems (NMSs). A managed device is a network device that has an SNMP agent and resides on a managed network. These network devices can be routers, servers, switches, bridges, hubs, computers, printers, etc. An agent may be a software module residing within a device. This agent translates information into a compatible format with SNMP. A NMS runs monitoring applications and provides the majority of processing and memory resources required for network management.

MIB stands for management information base and is a collection of information organized hierarchically. MIBs are accessed using a protocol such as SNMP. There are two types of MIBs: scalar and tabular. Scalar objects define a single object instance and tabular objects define multiple related object instances grouped in MIB tables. MIB files for specific devices or systems can be compiled and accessed for subsequent reference purposes.

OIDs or object identifiers uniquely identify managed objects in a MIB hierarchy, which can be depicted as a tree, the levels of which are assigned by different organizations. Top level MIB object IDs (OIDs) belong to different standard organizations. Vendors define private branches including managed objects for their own products. Generally, OIDs are used to identify concern areas with a network device, such as, limited CPU capacity, memory and hard disk statistics. Problems with these concern areas may trigger alarms which would notify network administrators that action must be taken. False positive alarms are alarms which are activated but do not represent actual problems with a network device.

The SNMPWalk procedure permits the detection of a set of variables that are available for reading on a particular device. By analyzing the results of a network device scan obtained through a SNMPWalk procedure, it is possible to develop a list of supported management information base files (MIBs) and, obtain descriptions of variables and possible values. After analyzing information retrieved with the SNMPWalk procedure from hardware or software SNMP sources, other tools may be used, such as, SNMPSet and SNMPGet tools to change and obtain values.

An SNMP OID (object identifier) is assigned to an individual object within a management information base (MIB). A MIB can be broken down into a tree structure. Within this structure, individual OIDs are representative of the leaves on the tree. More specifically, an OID is a string of numbers readable only to the MIB. OIDs are important in the assembly of SNMP messages. An SNMP OID functions as an address that identifies the location of a specific element within the entire SNMP network. The translation of OIDs allows the SNMP administrator to determine values for these objects. The MIB assigns readable labels to each OID, which allows the manager to interpret and assemble SNMP messages.

Without the OID, the message cannot be translated into a form that is understandable. When the SNMP administrator requests the value of any object, it assembles a message with the OID, which is sent to the MIB for decoding. If the OID is listed within the MIB at that particular management station, a message is sent back to the manager including the value requested for that particular OID.

Discovering information pertaining to the network devices includes obtaining OID information for each device. As noted previously, hundreds or even thousands of sample SNMP monitor sets may be predefined and available for pairing to network devices based on the discovered and extracted OID information. Once a SNMP device is discovered, the numerous sample monitor SNMP sets may be presented to find an appropriate match or best fit for the SNMP device. The more customized the sample monitor SNMP set is to the network device, the less chance of false positive alarms occurring.

An email notification may be used to report the results of the SNMPWalk procedure. The email may be sent as part of an emailNotify execution procedure. Once the OIDs are obtained from the network devices, the OIDS are compared to the SNMP sample sets stored in memory. Each match between the OIDs and the SNMP sample sets is a "hit." There may be multiple hits for each network device OID. The most relevant SNMP sample set(s) are identified and the most relevant SNMP sample sets are identified and assigned to the OID and its corresponding SNMP network device. The assignments may be performed via a emailNotify process.

One example algorithm that may be used to determine the relevancy of the sample set(s) is disclosed below. The greater the number of hits the greater the relevancy of a sample set. Certain factors may increase or decrease the relevancy of the sample set. For example, the expression (ratio of hits)/(total number of OID items in the SNMP Monitor Set) may provide a relative relevancy score. For instance, 10 hits out of 10 OID items, has a greater relevancy that 12 hits out of 20 OID items.

Hits in a 'private' SNMP branch (1.3.6.1.4.1 . . . ) are 'scored' higher than hits in other branches, such as, MIB2 or RMON branches (1.3.6.1.2.1 . . . ). The SNMP 'private' branch may be specific to a vendor (1.3.6.1.4.1.9=Cisco, 1.3.6.1.4.1.11=HP, etc.), and thus almost always produces more relevant hits than the common OID values of the 'standard' branches which the SNMP devices support. It may be assumed that a scored hit in the private branch is 50% more relevant than a hit in the non-private branch.

Figure 3:
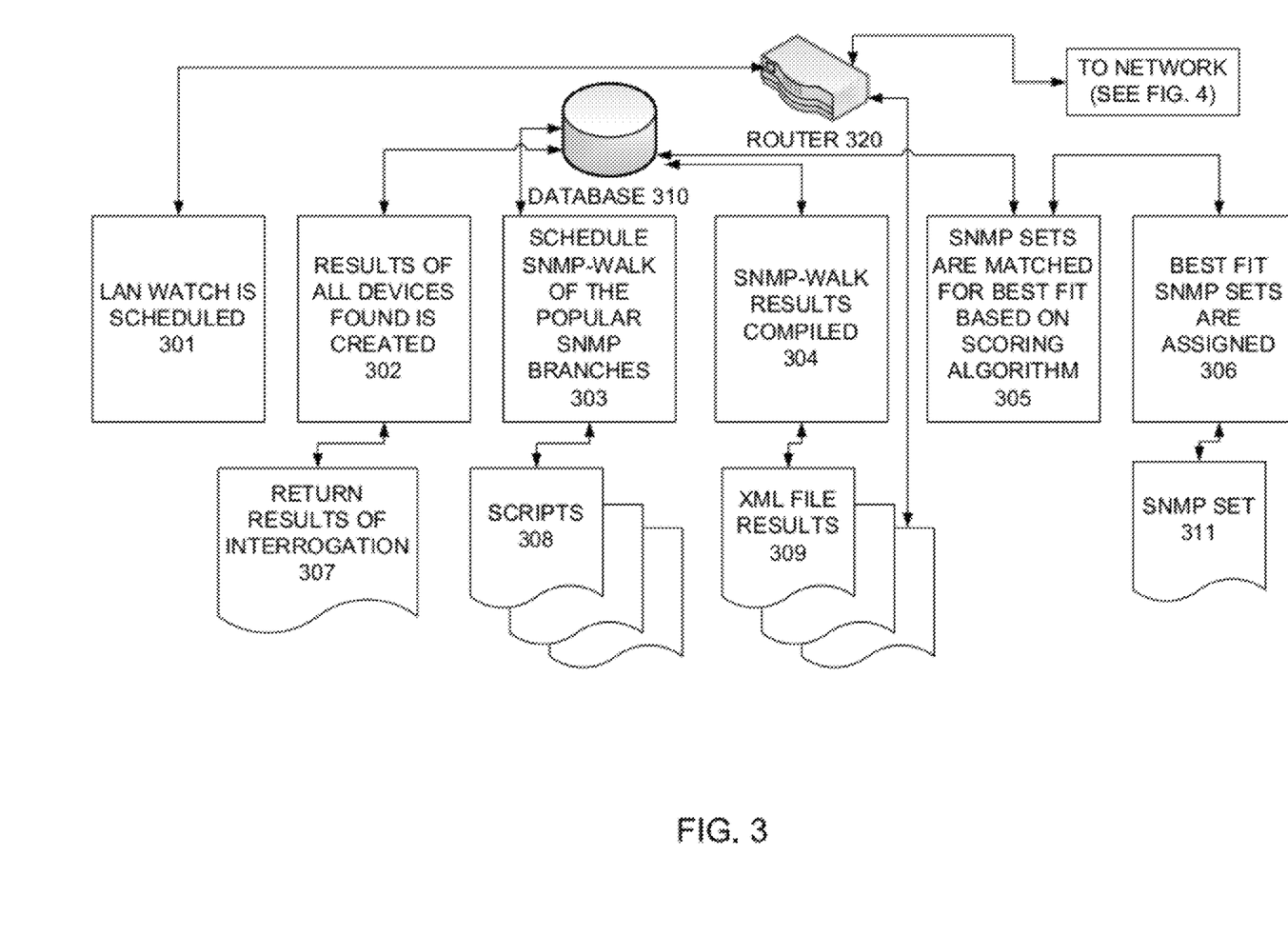
FIG. 3 illustrates an example data flow diagram, according to example embodiments of the present invention.

An OID Item may be represented by an OID number plus an instance number. For example, if a firewall device was being monitored and it was necessary to monitor the bytes leaving the device, then it may be appropriate to monitor the OID=1.3.6.1.2.1.2.2.1.16. However, for a firewall device with multiple ports, the port representation may be indicative of a table of values, in this example one value for each port. For example, 1.3.6.1.2.1.2.2.1.16.1=the 'out octets' for port number 1 (fast ethernet port). 1.3.6.1.2.1.2.2.1.16.3=the 'out octets' for port number 3 (T1 0/0 port). The final number, in this case the 1 and 3 representing items of a table, are called 'instances.' The OID+instance makes up an OID item. The instance represents a 'table' of values. Other examples include disks, temperature sensors, paper trays of printers, etc. Non-scalar OID values have only one value and are represented via "0" (zero): 1.3.6.1.2.1.1.1.0=SNMP description for which there is only one FIG. 3 illustrates an example flow diagram of operations performed by example embodiments of the present invention. Referring to FIG. 3, a LAN watch is scheduled at operation 301 and is communicated to the router 320. The results of all devices found during the LAN watch procedure are saved in a database 310, at operation 302. The results of the interrogation procedure may be stored in memory 307. A SNMP-Walk of the popular SNMP branches may be performed at operation 303, which may be based on script files 308 stored in memory. The results of the SNMPWalk may be compiled at operation 304, and the information may be stored in XML files 309. A scoring algorithm may be used to match the most relevant SNMP sets to the identified network devices based on the identified OIDs, at operation 305. The best fitting SNMP sets are identified and assigned to the appropriate network devices, at operation 306. The results are stored in memory 311.

Figure 4:
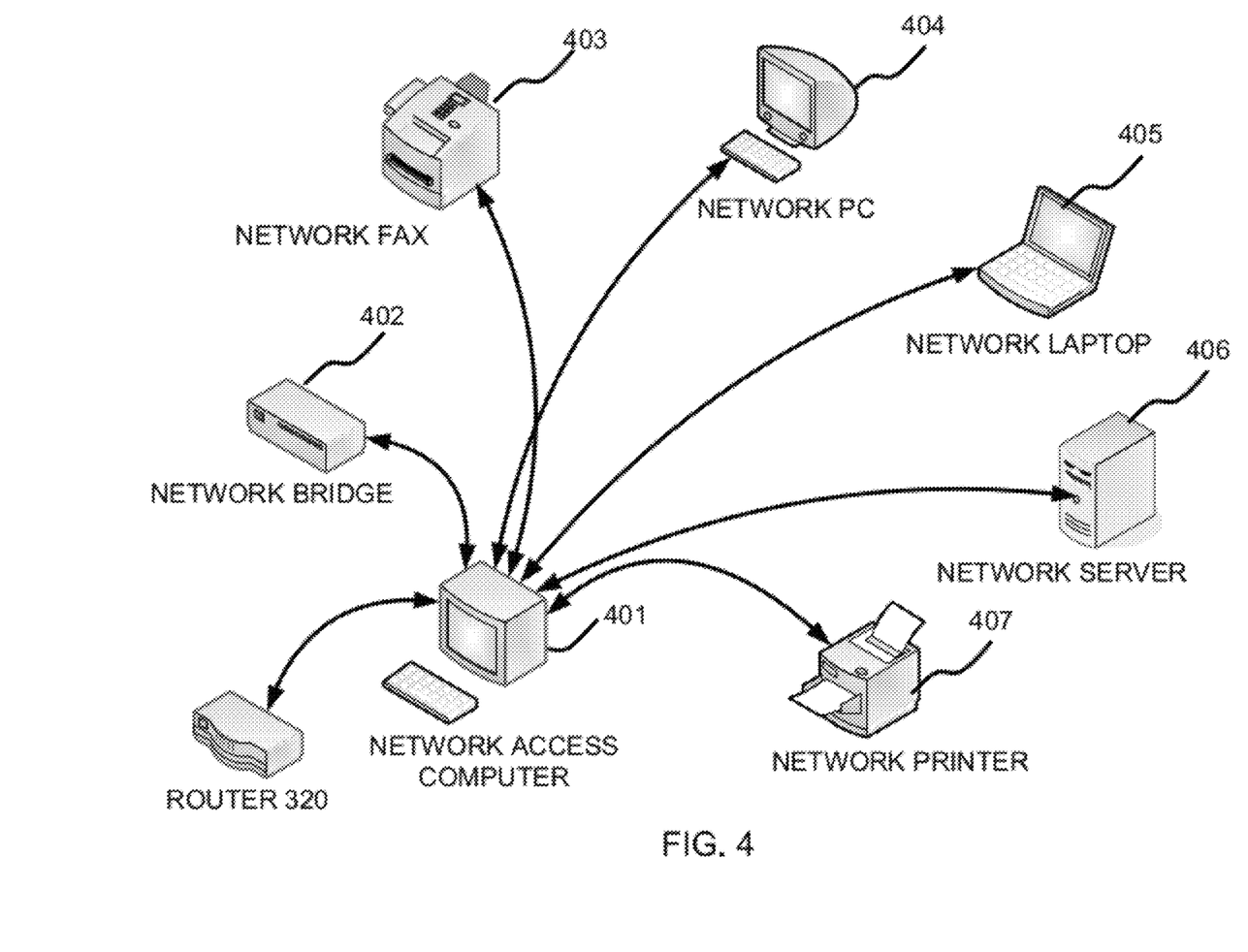
FIG. 4 illustrates an example network configuration of computer devices being interrogated, according to example embodiments of the present invention.

FIG. 4 illustrates a continuation of FIG. 3, where the router 320 is configured to access network access computer 401 of the customer network. Referring to FIG. 4, when the interrogation SNMPWalk and/or other network monitoring and auditing procedures are performed, the router 320 will access the network access computer 401 of the customer site. All of the network devices 402-207 may be identified, which may include devices, such as, a network bridge, 402, a network fax 403, a network PC 404, laptop 405, server 406 and network printer 407. Other network devices not shown may also be identified. The results of the auditing/monitoring may be returned to the router 320 and stored in memory 310 for processing and selection of SNMP sets.

By matching SNMP sample sets to network devices based on identified relevancy scores and other matching criteria, administrative time and resources may be saved. Furthermore, manually matching which sample sets are best suited for discovered network resources is subject to human error. By scoring the relevancy of SNMP sample sets paired with identified network devices, the most relevant sample set may be selected and false positive alarms may be reduced.

The operations of a method or algorithm described in connection with the embodiments disclosed herein may be embodied directly in hardware, in a computer program executed by a processor, or in a combination of the two. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

An exemplary storage medium may be coupled to the processor such that the processor may read information from, and write information to, the storage medium. In the alternative, the storage medium may be integral to the processor. The processor and the storage medium may reside in an application specific integrated circuit ("ASIC"). In the alternative, the processor and the storage medium may reside as discrete components. For example FIG. 5 illustrates an example network element 500, which may represent any of the above-described network components 102, 103, 104, 105, 201, 202, 203, 310, 320, 401-407.

Figure 5:
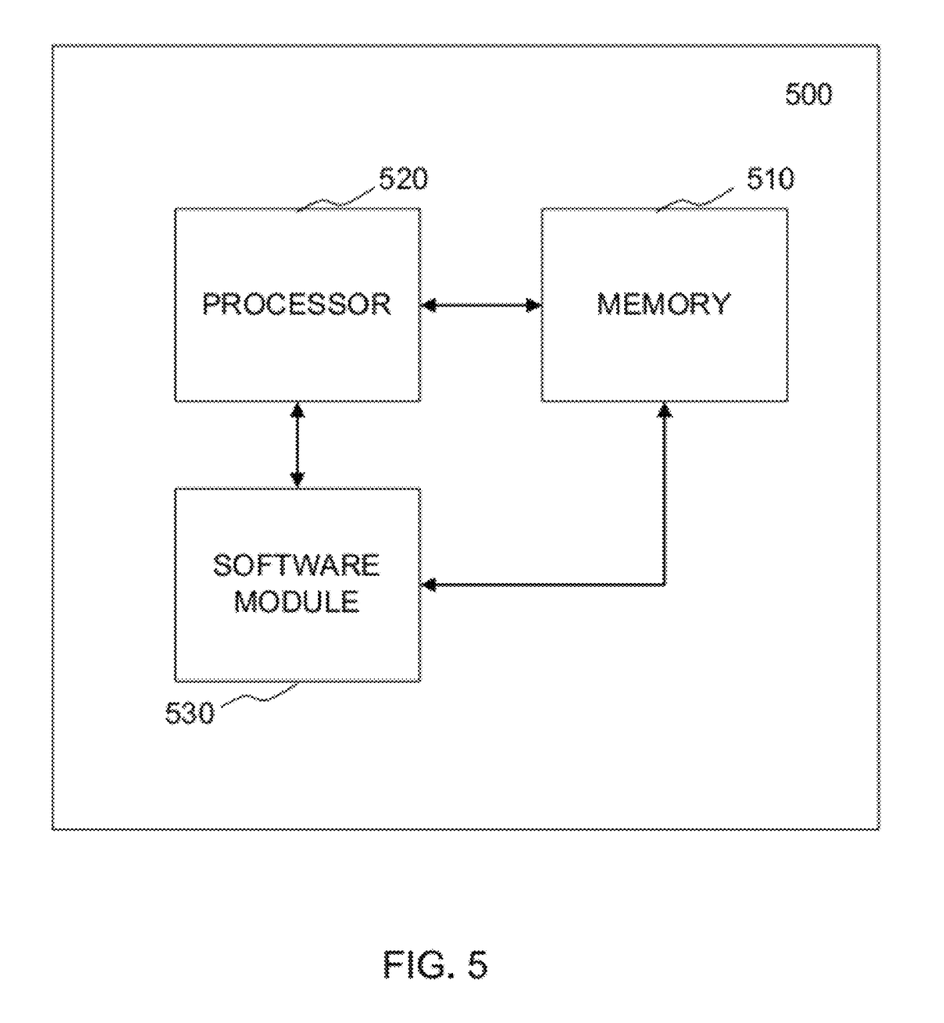
FIG. 5 illustrates an example network entity configured to store and execute any of the example applications described in the specification, according to example embodiments of the present invention.

As illustrated in FIG. 5, a memory 510 and a processor 520 may be discrete components of the network entity 500 that are used to execute an application or set of operations. The application may be coded in software in a computer language understood by the processor 520, and stored in a computer readable medium, such as, the memory 510. The computer readable medium may be a non-transitory computer readable medium that includes tangible hardware components in addition to software stored in memory. Furthermore, a software module 530 may be another discrete entity that is part of the network entity 500, and which contains software instructions that may be executed by the processor 520. In addition to the above noted components of the network entity 500, the network entity 500 may also have a transmitter and receiver pair configured to receive and transmit communication signals (not shown).

Figure 6:
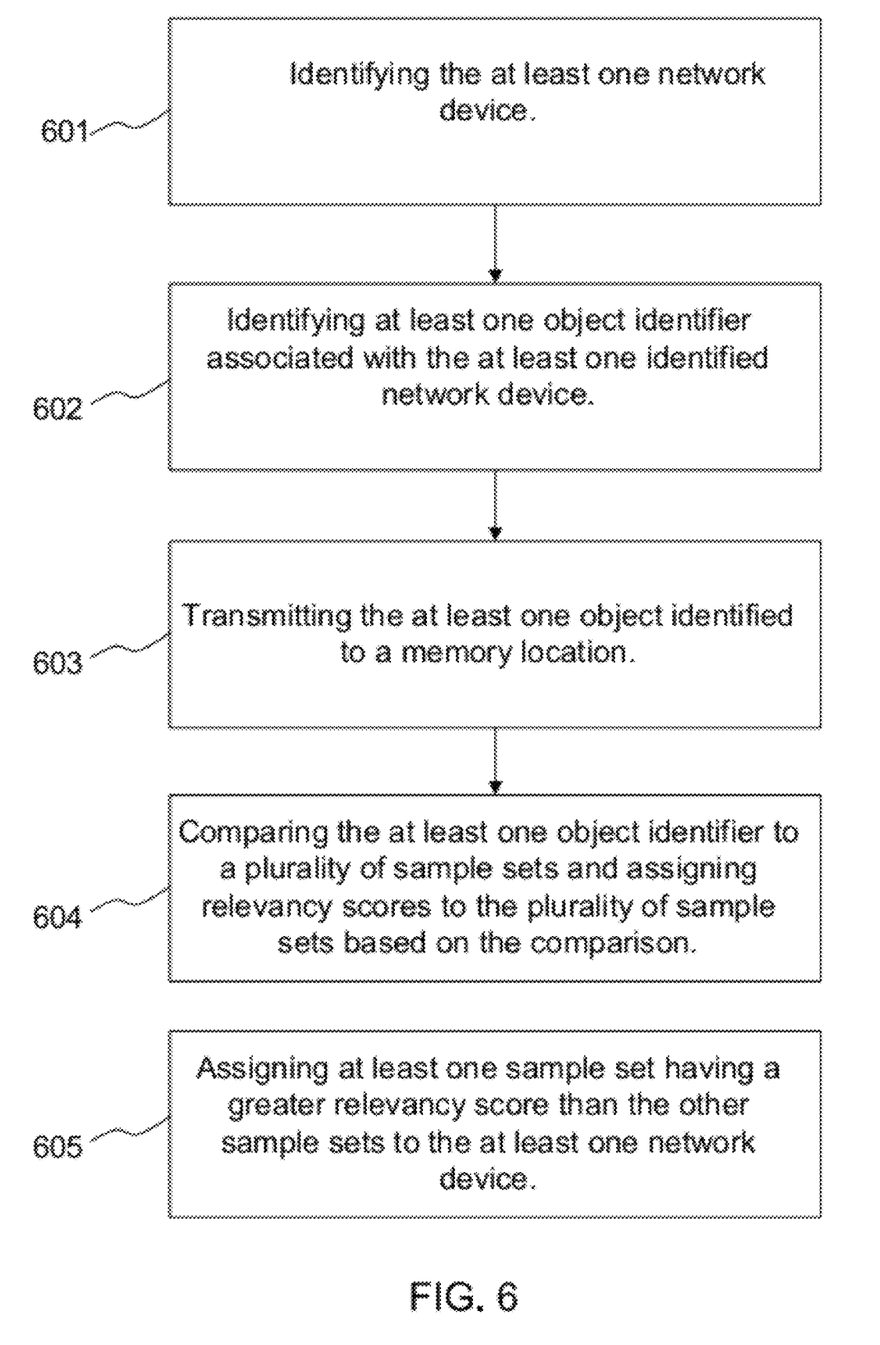
FIG. 6 illustrates an example method according to example embodiments of the present invention.

One example method of assigning a sample set to a network device operating on a network is illustrated in the flow diagram of FIG. 6. Referring to FIG. 6, a first operation may include identifying the at least one network device at operation 601. Other example operations may include identifying at least one object identifier associated with the at least one identified network device at operation 602 and transmitting the at least one object identified to a memory location at operation 603. Other operations may include comparing the at least one object identifier to a plurality of sample sets and assigning relevancy scores to the plurality of sample sets based on the comparison at operation 604 and assigning at least one sample set having a greater relevancy score than the other sample sets to the at least one network device at operation 605.

While preferred embodiments of the present invention have been described, it is to be understood that the embodiments described are illustrative only and the scope of the invention is to be defined solely by the appended claims when considered with a full range of equivalents and modifications (e.g., protocols, hardware devices, software platforms etc.) thereto.

What is claimed is:

1. A method of assigning a sample set to a network device operating on a network, the method comprising:
    identifying the at least one network device;
    identifying at least one object identifier associated with the at least one identified network device;
    transmitting the at least one object identified to a memory location;
    comparing the at least one object identifier to a plurality of sample sets and assigning relevancy scores to the plurality of sample sets based on the comparison; and
    assigning at least one sample set having a greater relevancy score than the other sample sets to the at least one network device.

2. The method of claim 1, wherein the network device is at least one of a computer, printer, fax machine, server, router, bridge, switch, laptop and smartphone.

3. The method of claim 1, wherein the comparing operation comprises comparing the at least one object identifier to the plurality of sample sets and determining a number of matches between the at least one object identifier and object identifiers included in each of the plurality of sample sets.

4. The method of claim 3, wherein the sample set having the greater relevancy score has a greatest number of matches between the at least one object identifier and object identifiers of the sample set having the greater relevancy score.

5. The method of claim 1, further comprising:
    performing a SNMPWalk operation when performing the identifying operations.

6. The method of claim 1, further comprising:
    performing a local area network (LAN) watch operation when performing the identifying operations.

7. The method of claim 5, wherein the SNMPWalk operation is performed on popular branches of the network.

8. An apparatus configured to assign a sample set to a network device operating on a network, the apparatus comprising:
    a processor configured to
        identify the at least one network device,
        identify at least one object identifier associated with the at least one identified network device; and
    a transmitter configured to transmit the at least one object identified to a memory location,
    and wherein the processor is further configured to
        compare the at least one object identifier to a plurality of sample sets and assigning relevancy scores to the plurality of sample sets based on the comparison, and
        assign at least one sample set having a greater relevancy score than the other sample sets to the at least one network device.

9. The apparatus of claim 8, wherein the network device is at least one of a computer, printer, fax machine, server, router, bridge, switch, laptop and smartphone.

10. The apparatus of claim 8, wherein the comparing operation comprises comparing the at least one object identifier to the plurality of sample sets and determining a number of matches between the at least one object identifier and object identifiers included in each of the plurality of sample sets.

11. The apparatus of claim 10, wherein the sample set having the greater relevancy score has a greatest number of matches between the at least one object identifier and object identifiers of the sample set having the greater relevancy score.

12. The apparatus of claim 8, wherein the identifying operations comprise performing a SNMPWalk operation.

13. The apparatus of claim 8, wherein the identifying operations comprise performing a local area network (LAN) watch operation.

14. The apparatus of claim 12, wherein the SNMPWalk operation is performed on popular branches of the network.

15. A non-transitory computer readable storage medium comprising instructions that when executed cause a processor to perform assigning a sample set to a network device operating on a network, the processor being further configured to perform:
- identifying the at least one network device;
- identifying at least one object identifier associated with the at least one identified network device;
- transmitting the at least one object identified to a memory location;
- comparing the at least one object identifier to a plurality of sample sets and assigning relevancy scores to the plurality of sample sets based on the comparison; and
- assigning at least one sample set having a greater relevancy score than the other sample sets to the at least one network device.

16. The non-transitory computer readable storage medium of claim 15, wherein the network device is at least one of a computer, printer, fax machine, server, router, bridge, switch, laptop and smartphone.

17. The non-transitory computer readable storage medium of claim 15, wherein the comparing operation comprises comparing the at least one object identifier to the plurality of sample sets and determining a number of matches between the at least one object identifier and object identifiers included in each of the plurality of sample sets.

18. The non-transitory computer readable storage medium of claim 17, wherein the sample set having the greater relevancy score has a greatest number of matches between the at least one object identifier and object identifiers of the sample set having the greater relevancy score.

19. The non-transitory computer readable storage medium of claim 15, further comprising:
- performing a SNMPWalk operation when performing the identifying operations.

20. The non-transitory computer readable storage medium of claim 15, further comprising:
- performing a local area network (LAN) watch operation when performing the identifying operations.

* * * * *